July 18, 1939.  A. S. CHANDLER  2,166,716
INDEX AND BRAKE DEVICE
Filed Jan. 26, 1939
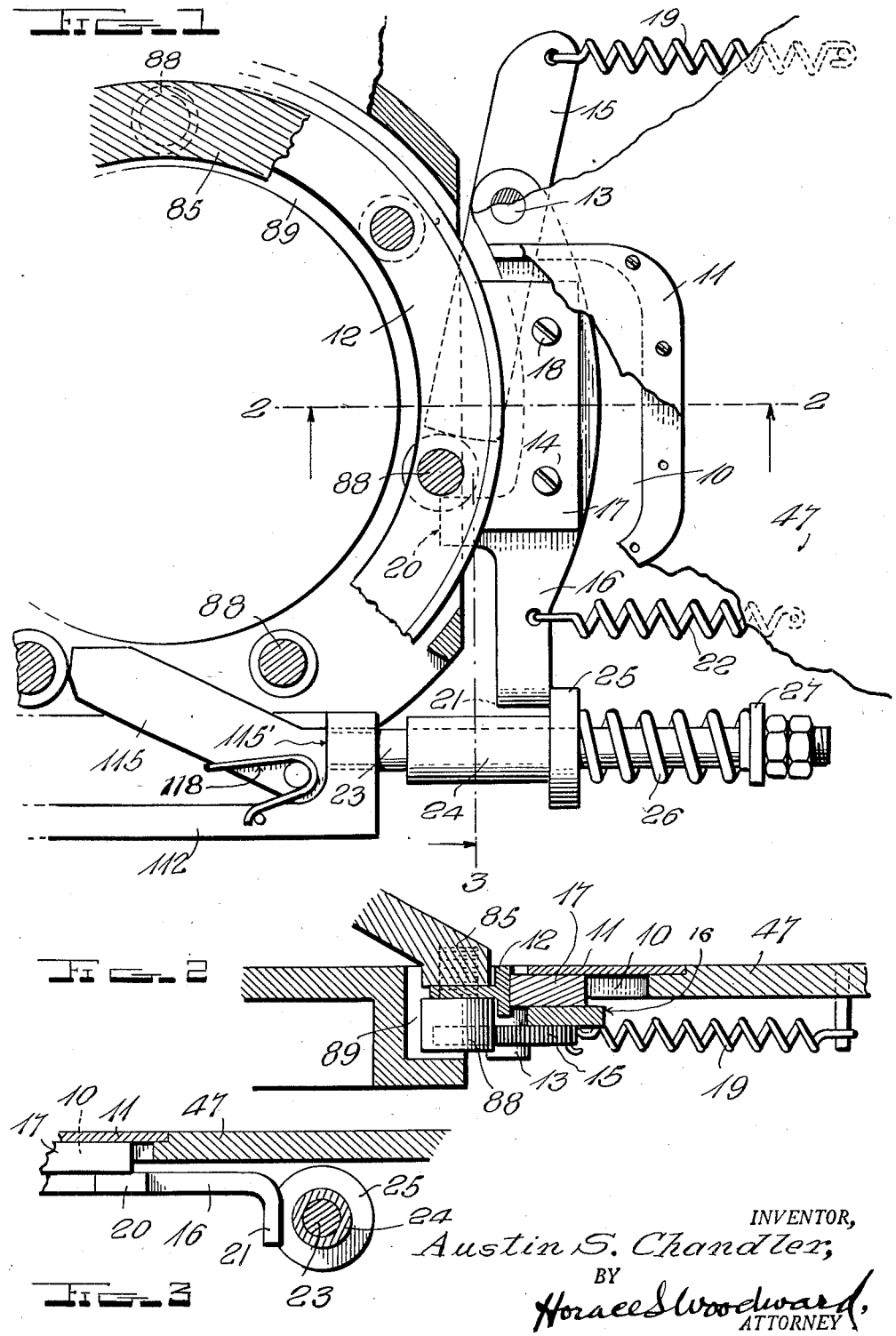
INVENTOR,
Austin S. Chandler;
BY
Horace S Woodward,
ATTORNEY Patented July 18, 1939

2,166,716

UNITED STATES PATENT OFFICE 2,166,716

INDEX AND BRAKE DEVICE

Austin S. Chandler, Fitchburg, Mass., assignor to The Brown Bag Filling Machine Company, Fitchburg, Mass., a corporation of Massachusetts Application January 26, 1939, Serial No. 253,023

6 Claims. (Cl. 74—128)

This invention relates to means for effecting the indexing of a turn-table or conveyor or other rotating element in various machines, and in the present instance is specially designed to operate in the bag filling machine disclosed in my copending application Serial No. 108,487, filed October 30, 1936.

It is an aim of the invention to present means whereby noise and shocks in the mechanism may be minimized and whereby the security and accuracy of the positioning of the rotating device in its successive steps of movement may be assured.

It is also an aim to reduce the liability of movement of the index table or the like beyond a desired definite position on each step in a device using a reciprocating element with pawl thereon to engage and propel projecting members on the index table and the like.

Additional objects, advantages and features of invention reside in the construction, arrangement and combination of parts involved in the embodiment of the invention as will appear from the following description and accompanying drawing, wherein:

Figure 1 is a top view of an index device for my said prior machine, with parts broken away to show the operative parts.

Figure 2 is a cross section through the brake device on a radial plane of the index table, on line 2—2 of Figure 1.

Figure 3 is a section on the line 3—3 of Figure 1.

There is illustrated a portion of the table 47 of my prior application, a bar 112, mounted thereon as described in said application and to be operated in the same manner; but its specific form differing from that of the bar 112 of the said application in that the adjustment of the pawl 115 for varying the position given the index pin is omitted and other features to be described added. Also there is involved the same location and arrangement of the index pins 88 of the prior application; these may be termed "strikes".

The table 47 is formed with an opening 10 therethrough immediately adjacent the groove 89 in which the pins 88 are accommodated as they move with the index table 85, this opening being closed by a thin plate 11 by which parts thereunder are covered, yet made accessible for adjustment or replacement. The index table 85 has a brake ring 12 secured to the under part thereof over the pins and concentric with the axis of the index table at a level with the adjacent top body portion of the table 47. The bar 112 is suitably recessed to permit pivoting of the pawl 115 thereon which is spring-pressed, so as to swing yieldingly at its forward end into the path of the pins 88, and also formed with a heel portion 115' to check it at its proper limit and sustain the thrust imparted to the pins by movement of the bar to the left as viewed in Figure 1.

The brake face of the ring 12 is thus located approximately flush with the top of the table 47 and passes the opening 10, which is located a distance from the bar 112 and approximately on a line tangent to the index table at right angles to the longitudinal projection of the bar. It is adjacent the rear of the machine described in my prior application, on a fore-and-aft line. Just beyond the opening 10 opposite the bar 112, there is engaged in the under side of the table 47 a hinge pin 13, and adjacent this pin and beneath the opening 10, the outer wall of the channel 89 in the table 47 is cut away to afford clearance for operation of a brake 14 and back stop pawl 15, both pivoted on the pin. The brake includes a lever 16 spaced slightly from and swinging beneath the under surface of the table 47, and having a brake block 17 of suitable friction material secured on the upper side thereof, movable within the opening 10 close against the plate 11. The brake block is secured upon the upper side of the lever removably by means of screws 18, which may be removed when the plate 11 is taken off. The plate is set in suitably relieved edge parts of the table 47 beside the opening 10 so as to be flush with the top of the table. Pivoted on the pin 13 below the lever 14 is the back stop pawl 15, which is a simple rectilinear lever having an arm arranged to swing into the channel 89 and having a transverse end face immediately adjacent or against a pin 85 so as to prevent reverse motion thereof after index motion by the pawl 115. This end face of the pawl 15 is curved on a radius shorter than its radius from the pin 13, or inclined, so that it can move into such snug engagement with a pin as to assure its firm support in indexed position. The pawl is continued beyond its pivot to form a rear arm to which a retractile spring 19 is attached, anchored to the table 47 and tending to hold the back stop projected into the channel 89.

The lever 16 is projected toward the bar 112 from the brake block 17 and at its side next the path of the pins 88 is formed with a lug or stop 20 adapted to pass in front of the pin behind which the back stop engages, preventing possibility of the index table passing beyond desired position. The lever 16 is continued further horizontally toward the bar 112 to be engaged by an element on the bar 112 to operate the lever. The lever 16 is retracted to disengaged position by a contractile spring 22 engaged therewith and anchored to the table 47.

Set in the rear end of the bar 112 there is a stud shaft or pin 23 projected longitudinally therefrom and having slidable thereon a sleeve 24 formed with a collar flange 25 adapted to engage against the rear side of the downward extension 21 of the lever 14 on forward movement of the sleeve. A helical protractile spring 26 engaged around the pin rearwardly of the collar is confined by nuts and washer 27 on the end of the shaft 23, so that the collar is pressed forward against the lever 14. The spring 26 is of greater strength than the spring 22, so that the lever 16 is held forwardly either until the brake block engages the brake ring 12 or until the sleeve is engaged by the end of the bar 112.

In the operation of the machine, the bar 112 is reciprocated at proper intervals with periods of rest and when moved to the right to its rearmost position the pawl 115 wipes against the forward side of the next pin 88 to be propelled, and is fended inwardly over the bar 112 until its outer end clears the pin, when it swings outward from the bar 112 so as to engage behind the pin 88 which pressed it inward. When at this rearmost position, the spring 26 will have expanded until the sleeve 24 is against the end of the bar 112 and movement of the latter further will then have moved the collar 25 far to the right of braking position of the lever; and the swinging end of the brake lever will be drawn rearwardly against the collar by the spring 22 so that the brake block will be well clear of the brake ring 12. During the rearward movement of the bar 112 and wiping engagement of the pawl 115 with the pin 88, the pins and index table are held against reverse movement by the back stop 15. As the bar 112 moves forwardly the brake being disengaged, the pawl 115 is able to press the pin 88 before it with a minimum of obstruction. Just before the index table terminates its stage of movement due to the propulsion of the pin 88 by the pawl 115, the brake shoe 17 engages the brake ring 112 preventing the movement of the index table from exceeding that imparted through the pawl 115, and the lug 20 moves into place before the pin 88 which is then coming to position at the end of the back stop pawl 15. The latter snaps forwardly behind the pin a little later and this pin 88 is then held between the pawl 15 and lug 20. As the final movement of the bar 112 and index table continues after the brake block engages the brake ring, the collar 25 yields to the end of the brake lever 16, so that the spring 26 is slightly further compressed while the sleeve 24 is cleared by the end of the bar 112 a distance, as shown in Figure 1.

If desired, the stroke adjustment features in the mounting of the pawl 115 shown in my prior application may be incorporated herein and other modifications of constructions made within the scope of the claims without departing from the spirit of the invention.

I claim:

1. An index device consisting of a rotatable member having a plurality of concentrically spaced strikes thereon, a reciprocable pawl mounting movable beside the path of the strikes and having a pawl positioned thereon to engage and to propel the strikes on movement of the mounting in one direction in its reciprocation, said rotatable member having a brake ring, a brake member mounted for movement in a fixed path toward and away from said ring and having a friction element thereon to engage the ring at one limit of movement of the brake member, a resilient operative connection between the pawl mounting and brake member, said brake member having an extension so located that at the full braking position of the brake member said extension will lie in the path of said strikes at the desired limit of step movement thereof by said pawl but will be clear of the strikes at full release position of the brake member, and means to retract the brake member to clear said extension from said path.

2. The structure of claim 1 in which said strikes consist of a series of projections, and a spring-pressed back stop member and mounting therefor for movement of the back stop in a fixed path into and out of the path of said strikes, yieldable to the strikes in their movement by said pawl, and arranged to engage close behind one strike when at said desired limit of step movement.

3. An index device consisting of a rotatable member having a plurality of concentrically spaced strikes thereon, a reciprocable bar without the path of the strikes, a pawl normally positioned thereon to engage and propel the strikes on movement of the bar in one direction in its reciprocation and yieldable to the strikes on opposite movement of the bar, a concentric brake ring on said rotatable member, a lever pivoted laterally of the bar toward the brake ring, a brake member on the lever for movement toward and away from said ring and having a friction element thereon to engage the ring at one limit of movement of the brake member, a brake operating member slidably mounted on the bar for longitudinal movement relative thereto, and positioned to engage the outer side of said lever, a spring engaged between the bar and the brake operating member under tension tending to force the brake operating member against the lever, means to stop relative sliding movement of the brake operating member on the bar by said spring whereby it will be clear of the lever at predetermined parts of the movement of the bar, a back stop lever pivoted adjacent the rotatable member and having a radius to swing behind one of the strikes at its limit of movement by said pawl, yielding means to hold the back stop lever in a back stop position, a lug on the lever positioned to engage before a strike when the back stop lever is in back stop position, means to operate the bar, and means yieldable to engaging movement of the brake operating member, tending to hold the brake in released position.

4. The structure of claim 3 in which said back stop lever is pivoted commonly with the lever and arranged to back stop a strike engaged by the said lug.

5. The structure of claim 3 in which said lever is mounted to oscillate substantially in the plane of rotation of said rotatable member and said bar is reciprocable in the general direction of movement of the lever, said bar having a shaft extended longitudinally therefrom adjacent the lever, said brake operating member being a sleeve slidable on the shaft and having a part laterally extended sufficiently to engage the lever on movement to an extreme with the bar, a helical compression spring engaged loosely around the shaft against the outer part of the brake operating member, and longitudinally adjustable spring seat means on the shaft outwardly of the spring.

6. An intermittent motion device consisting of a member to be moved intermittently, and having a strike device thereon, a reciprocating member movable in a path adjacent the strike and having a pusher member thereon projected to a position to engage the strike, a brake face member operatively connected with the said member to be moved, a brake device including a brake movable into and out of engagement with said brake face member, yielding means to hold the brake disengaged, a part of said brake device being movable substantially in the same direction as said reciprocating member, a brake operating member slidable longitudinally on said reciprocating member and adapted to engage against the last named part of the brake device, a spring connected between the reciprocating member and said brake operating member under tension to overcome said yielding means and move the brake to applied position on one movement of the reciprocating member, and means to limit sliding movement of the brake operating member by said spring, whereby it will clear the brake device over part of the movement of the reciprocating member.

AUSTIN S. CHANDLER.